(12) United States Patent
Yabuuchi et al.

(10) Patent No.: US 9,685,834 B2
(45) Date of Patent: Jun. 20, 2017

(54) OUTDOOR FAN MOTOR AND AIR-CONDITIONING APPARATUS

(75) Inventors: Hironori Yabuuchi, Tokyo (JP); Shinji Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 194 days.

(21) Appl. No.: 14/378,344

(22) PCT Filed: Apr. 20, 2012

(86) PCT No.: PCT/JP2012/002734
§ 371 (c)(1),
(2), (4) Date: Aug. 13, 2014

(87) PCT Pub. No.: WO2013/157044
PCT Pub. Date: Oct. 24, 2013

(65) Prior Publication Data
US 2015/0003977 A1    Jan. 1, 2015

(51) Int. Cl.
*H02K 3/44*    (2006.01)
*H02K 3/28*    (2006.01)
*H02K 3/52*    (2006.01)
*H02K 5/22*    (2006.01)
*H02K 7/14*    (2006.01)
*H02K 5/08*    (2006.01)
*F04D 19/00*   (2006.01)
(Continued)

(52) U.S. Cl.
CPC ............. *H02K 3/44* (2013.01); *F04D 19/002* (2013.01); *H02K 3/28* (2013.01); *H02K 3/522* (2013.01); *H02K 5/225* (2013.01); *H02K 7/14* (2013.01); *H02K 1/148* (2013.01); *H02K 3/02* (2013.01); *H02K 5/08* (2013.01); *H02K 2203/06* (2013.01)

(58) Field of Classification Search
CPC .. H02K 3/02; H02K 3/28; H02K 3/44; H02K 3/522; H02K 5/225; H02K 2203/06; H02K 1/148; H02K 5/08; H02K 7/14; F04D 19/002
USPC ........................... 310/66, 68 R, 71, 179, 194
See application file for complete search history.

(56) References Cited

U.S. PATENT DOCUMENTS 6,856,055 B2 *  2/2005  Michaels ............... H02K 3/522
                                                  310/254.1
7,202,581 B2 *  4/2007  Sasaki .................... H02K 3/522
                                                  310/71
(Continued)

FOREIGN PATENT DOCUMENTS

CN         1883101 A      12/2006
CN       101970955 A       2/2011
(Continued)

OTHER PUBLICATIONS

Machine translation of JP 4989665B2.*
(Continued)

*Primary Examiner* — John K Kim
*Assistant Examiner* — Minki Chang
(74) *Attorney, Agent, or Firm* — Posz Law Group, PLC (57) ABSTRACT

In a motor, a connection portion between a lead wire and an aluminum wire is provided distant from a terminal block, with a leading end of a winding residing on one of cores that is not adjacent to a core that is at a position where the terminal block is provided.

6 Claims, 8 Drawing Sheets

(51) Int. Cl.
*H02K 3/02* (2006.01)
*H02K 1/14* (2006.01)

(56) References Cited

U.S. PATENT DOCUMENTS

| | | | |
|---|---|---|---|
| 8,653,711 B2* | 2/2014 | Burch | H02K 3/28 |
| | | | 29/596 |
| 2005/0073204 A1 | 4/2005 | Puterbaugh et al. | |
| 2006/0186746 A1* | 8/2006 | Nanbu | H02K 11/40 |
| | | | 310/68 R |
| 2008/0012438 A1* | 1/2008 | Hong | F04B 17/03 |
| | | | 310/71 |
| 2008/0024032 A1* | 1/2008 | Futami | H02K 3/522 |
| | | | 310/254.1 |
| 2009/0108717 A1* | 4/2009 | Jang | F24F 1/38 |
| | | | 312/100 |
| 2010/0066185 A1* | 3/2010 | Kosaki | H02K 5/225 |
| | | | 310/71 |
| 2010/0329907 A1 | 12/2010 | Jung et al. | |
| 2011/0035933 A1* | 2/2011 | Jang | H02K 3/50 |
| | | | 29/596 |
| 2013/0140922 A1* | 6/2013 | Yabe | H02K 1/2706 |
| | | | 310/51 |

FOREIGN PATENT DOCUMENTS

| | | |
|---|---|---|
| JP | 52-098901 A | 8/1977 |
| JP | 04-038146 A | 2/1992 |
| JP | 07-046782 A | 2/1995 |
| JP | 2603907 A | 1/1997 |
| JP | 11-275813 A | 10/1999 |
| JP | 2000-069705 A | 3/2000 |
| JP | 2000-134844 A | 5/2000 |
| JP | 2000-324762 A | 11/2000 |
| JP | 2001-268843 A | 9/2001 |
| JP | 2010-187435 A | 8/2010 |
| JP | 4989665 B2 * | 8/2012 |

OTHER PUBLICATIONS

Machine translation of JP 04-038146A.*
International Search Report of the International Searching Authority mailed Jul. 17, 2012 for the corresponding international application No. PCT/JP2012/002734 (and English translation).
Office Action mailed on Jun. 2, 2015 in the corresponding JP application No. 2014-510965. ( English translation attached ).
Office Action issued Jan. 12, 2016 in the corresponding JP application No. 2014-510965 (with English translation).
Extended European Search Report Issued Mar. 24, 2016 in the corresponding EP application No. 12874640.1.
Office Action mailed on Mar. 22, 2016 issued in the corresponding Chinese patent application No. 201280072395.5 (and English translation).
Office Action dated Sep. 9, 2016 issued in corresponding CN patent application No. 201280072395.5 (and English translation).
Office Action dated Jan. 25, 2017 issued in corresponding CN patent application No. 201280072395.5 (and English translation).

* cited by examiner

⇨ WIND DIRECTION

NEUTRAL POINT

OUTDOOR FAN MOTOR AND AIR-CONDITIONING APPARATUS

CROSS REFERENCE TO RELATED APPLICATION

This application is a U.S. national stage application of International Application No. PCT/JP2012/002734 filed on Apr. 20, 2012, the disclosure of which is incorporated by reference.

TECHNICAL FIELD

The present invention relates to outdoor fan motors and air-conditioning apparatuses including such outdoor fan motors, and in particular to an outdoor fan motor in which water entry into the motor is suppressed and an air-conditioning apparatus including the outdoor fan motor.

BACKGROUND ART

Hitherto, various motors have been proposed in each of which a stator includes a plurality of tooth portions provided with respective windings and arranged annularly (see Patent Literature 1 to 5, for example). Such Patent Literature is intended to realize a reduction in the number of components, a reduction in the number of manufacturing steps, or an increase in the reliability of the motor by improving the method of connecting the windings on the tooth portions and the method of connecting an end of each winding and a lead wire. There is another motor in which a stator is covered with a mold (see Patent Literature 6, for example). Since aluminum is of lower cost than copper, which is currently in common use for motors, there is yet another motor in which aluminum wires are employed as windings for the purpose of cost reduction.

CITATION LIST

Patent Literature

Patent Literature 1: Japanese Unexamined Patent Application Publication No. 2000-134844
Patent Literature 2: Japanese Unexamined Patent Application Publication No. 2000-324762
Patent Literature 3: Japanese Unexamined Patent Application Publication No. 2001-268843
Patent Literature 4: Japanese Patent No. 2603907
Patent Literature 5: Japanese Unexamined Patent Application Publication No. 7-46782
Patent Literature 6: Japanese Unexamined Patent Application Publication No. 11-275813

SUMMARY OF INVENTION

Technical Problem

Supposing that the motor disclosed by any of Patent Literature 1 to 6 is applied to an outdoor fan motor of an outdoor unit included in an air-conditioning apparatus, it is necessary to consider the influence of water that may enter the motor. For example, even if the stator is covered with a mold as in the motor disclosed by Patent Literature 6, the probability of water entry cannot be eliminated completely. This is because it is necessary to draw lead wires outside of the mold so that electric power is supplied to the stator, and holes are accordingly provided in the mold. The lead wires may also be covered with the mold, and a portion of a terminal block may be embedded in the mold. Even in such a configuration, the probability of water entry cannot be eliminated completely.

If aluminum wires are employed as windings of a motor, the following problems should be considered as well.

(1) Since aluminum wires have low resistance to corrosion, if water or the like adheres to peripheral elements, the aluminum wires may corrode and eventually cause wire connection failure.

(2) The aluminum wires are each coated with enamel. The enamel coating over a portion of the aluminum wire is mechanically stripped, and the portion of the aluminum wire is twisted and dipped into solder. However, it is unclear whether or not the stripped portion is assuredly coated with the solder.

(3) Since the wires are each laid along a groove provided in the outer circumference of an insulator (also called spool), the wire is protected by a varnished tube or the like so that the occurrence of any damage to the enamel coating is prevented. However, since there is a gap between the varnished tube and the wire, water may enter the gap and may corrode the aluminum wire.

The present invention is to solve at least one of the above problems and to provide an outdoor fan motor in which water entry into the motor is suppressed and an air-conditioning apparatus including the outdoor fan motor.

Solution to Problem

An outdoor fan motor according to the present invention includes a stator including a plurality of cores and in which aluminum wires are used as windings, a rotor rotatably provided on an inner circumferential side of the stator, a body outer shell provided as a resin mold that secures the stator, a terminal block provided to a bottom portion of the body outer shell and including terminals with which the stator and an external power source are connected to each other, and lead wires made of copper wires and connecting the terminals of the terminal block to the aluminum wires forming the windings. A connection portion between each of the lead wires and a corresponding one of the aluminum wires is provided distant from the terminal block, with a leading end of each of the windings residing on one of the cores that is not adjacent to a core of the cores that is at a position where the terminal block is provided.

An air-conditioning apparatus according to the present invention includes a fan provided in a casing and configured to take in air from an air inlet and to blow the air that has passed through a heat exchanger from an air outlet, the above outdoor fan motor that drives the fan, and a supporting member to which the outdoor fan motor is secured with a securing member.

Advantageous Effects of Invention

In the present invention, since the connection portion between each of the lead wires and a corresponding one of the aluminum wires is provided distant from the terminal block, the probability of adhesion of water to the aluminum wires forming the windings in the resin mold is significantly reduced. Hence, according to the present invention, the life of the outdoor fan motor is extended.

According to the present invention, since the above outdoor fan motor is included, the reliability increases with the extension of the life of the outdoor fan motor.

DESCRIPTION OF EMBODIMENTS

Embodiment of the present invention will now be described with reference to the drawings.

Embodiment 1

Figure 1:
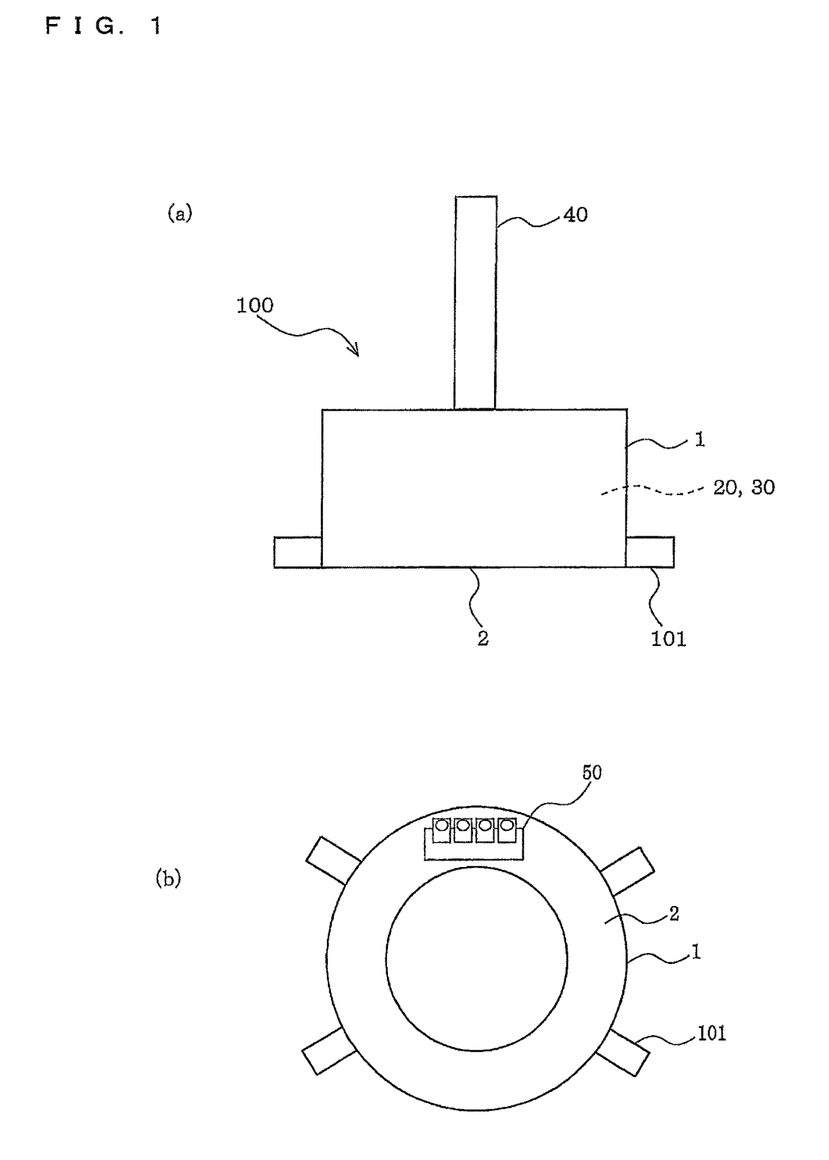
FIG. 1 is a diagram illustrating an outdoor fan motor according to Embodiment of the present invention.

FIG. 1 is a diagram illustrating an outdoor fan motor (hereinafter denoted as motor 100) according to Embodiment 1 of the present invention. Referring to FIG. 1, a configuration of the motor 100 will be described. In the drawings including FIG. 1 to be referred to below, elements illustrated are not necessarily scaled in their actual sizes. Moreover, in the drawings including FIG. 1 to be referred to below, the same or like elements are denoted by the same reference numerals, which applies to the entirety of the specification. Furthermore, the modes of the elements described herein are only exemplary, and the present invention is not limited thereto.

FIG. 1 includes part (a) as a side view of the motor 100, and part b) as a bottom view of the motor 100. As illustrated in FIGS. 1(a) and 1(b), the motor 100 includes a body outer shell 1, a stator 20 and a rotor 30 provided in the body outer shell 1, and a shaft 40 connected to the rotor 30. Furthermore, the body outer shell 1 has a bottom portion 2 provided at an end thereof (an end opposite to an end from which the shaft 40 projects). As illustrated in FIG. 1(b), a terminal block 50 to which lead wires 120 (see FIG. 4) connected to the stator 20 are connected is provided on an exposed surface of the bottom portion 2.

The body outer shell 1 has an annular shape surrounding an axial center. The stator 20 is fixed to the inner side of the body outer shell 1. The rotor 30 (not illustrated) that is rotatably supported by a bearing is provided on the inner circumferential side of the stator 20. The body outer shell 1 is constituted by an outer shell of a molded stator that is obtained by forming a resin mold over the stator 20. The kind of the resin that forms the mold is not specifically limited and may be, for example, unsaturated polyester, saturated polyester, foaming resin, or the like. While Embodiment 1 concerns an exemplary case of integral resin molding, the forming method is not limited to resin molding but may be aluminum die casting or metal machining.

A plurality of leg portions 101 are provided at an end of the body outer shell 1 that is on a side of the bottom portion 2. The leg portions 101 project outward from the periphery of the body outer shell 1. The leg portions 101 are formed of the resin that forms the body outer shell 1 and are formed integrally with the body outer shell 1. The leg portions 101 are provided for fastening the body outer shell 1 to a supporting member with securing members such as screws. The supporting member employed herein corresponds to a plate member, a rail, or the like that is provided in an outdoor unit. In plan view, the leg portions 101 are each provided at a position where the terminal block 50 is not provided. The number of leg portions 101 is not specifically limited. A number of leg portions 101 that are sufficient to secure the motor 100 to the supporting member only need to be provided.

The bottom portion 2 is provided at the end of the body outer shell 1 (the end opposite the end from which the shaft 40 projects) in such a manner as to cover the end of the body outer shell 1. The bottom portion 2 has an opening in its center. The bottom portion 2 is formed of the resin that forms the body outer shell 1 and is formed integrally with the body outer shell 1. The terminal block 50 is provided on an exposed surface of the bottom portion 2 (a surface spreading along the outer periphery of the motor 100) as described above. The bottom portion 2 is formed such that, for example, a step is provided at the end of the body outer shell 1 or the bottom portion 2 forms an end facet of the body outer shell 1. A portion of the terminal block 50 is exposed on the bottom portion 2. The terminal block 50 has terminals with which the stator 20 and an external power source are connected to each other.

The terminal block 50 is provided such that, for example, a base portion thereof is embedded in the bottom portion 2. In such a case, the base portion that is embedded is on end facets of some of split cores (split cores 21 illustrated in FIG. 4) included in the stator 20, and the lead wires 120 that are connected to the stator 20 are connected to the terminals that are provided in the base portion (see FIG. 7). That is, with the lead wires 120 connected to the terminals in the base portion of the terminal block 50, the lead wires 120 and the terminal block 50 as a whole are covered with the mold formed of the resin that forms the body outer shell 1. Hence, the motor 100 in which the base portion of the terminal block 50 is embedded in the bottom portion 2 is connectable to the external power source via the terminal block 50 without providing any exit portions for the lead wires 120. The external power source is connected to a terminal-exposed portion of the terminal block 50 via a power line that is not illustrated.

In Embodiment 1, since the lead wires 120 that are connected to the base portion of the terminal block 50 are covered with the mold formed of the resin that forms the body outer shell 1, the ease of production in the formation of the body outer shell 1 from resin is improved. Furthermore, since the terminal block 50 is provided in the bottom portion 2, the waterproofness is improved. Furthermore, since the leg portions 101 are each provided at a position where the terminal block 50 is not provided in plan view, wires connected to the terminal block 50 and the leg portions 101 do not interfere with each other, improving the ease of installation work.

Alternatively, for example, the terminal block 50 may be provided to the bottom portion 2 such that the base portion thereof is not embedded in the bottom portion 2. In such a case, however, exit portions for the lead wires 120 need to be provided on the bottom portion 2 or a side face of the body outer shell 1. Accordingly, water entry from the exit portions is more easily suspected. Therefore, it is more effective to take any of countermeasures to be described below.

While Embodiment 1 concerns an exemplary case where the split cores 21 that are connected annularly form the stator 20, the present invention is not limited to such a case. For example, the stator 20 may include cores only some of which are separable or all of which are originally connected to one another. In either case, the stator 20 only needs to include aluminum wires that are concentratedly wound around tooth portions.

Figure 2:
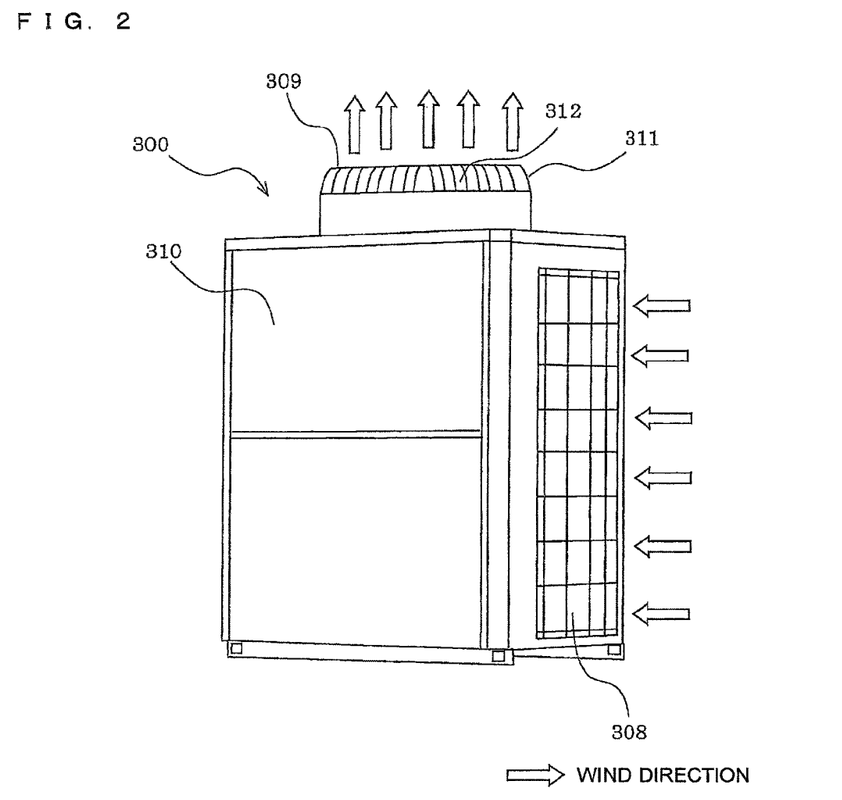
FIG. 2 is an external view of an outdoor unit including the outdoor fan motor according to Embodiment of the present invention.

Then, an air-conditioning apparatus (an outdoor unit 300) including the motor 100 according to Embodiment 1 and a state of securing of the motor 100 will be described. FIG. 2 is an external view of the outdoor unit 300 including the motor 100 according to Embodiment 1. Since the air-conditioning apparatus includes the motor 100, the reliability thereof is improved with the extension of the life of the motor 100.

As illustrated in FIG. 2, the outdoor unit 300 includes a casing 310 having a box-like shape, an air inlet 308 in the form of openings provided in a side face of the casing 310, a heat exchanger (not illustrated) provided in the casing 310 and extending along the air inlet 308, an air outlet 309 in the form of openings provided in the top face of the casing 310, a fan guard 311 covering the air outlet 309 while allowing air passage, and a fan 312 provided on the inner side of the fan guard 311 and driven by the motor 100. In the outdoor unit 300 having such a configuration, when the fan 312 is rotated, air is taken in from the air inlet 308 on the side face of the casing 310. The air passes through the heat exchanger, forms a vertical flow of air, and is blown upward from the air outlet 309 provided at the top of the casing 310.

In such a top-flow air-conditioning apparatus, dewdrops on the heat exchanger and water accumulated at the bottom of the casing 310 may be swirled up by the wind and may adhere to the motor that drives the fan 312. That is, simply providing the terminal block 50 to the bottom portion 2 is not enough as a countermeasure to the water problem. Although the base portion of the terminal block 50 is embedded in the bottom portion as described above, the bottom portion 2 cannot be sealed completely because there is a connection between the embedded portion and the exposed portion. Hence, it is desired to improve the waterproofness at the joint between the bottom portion 2 and the terminal block 50.

Figure 3:
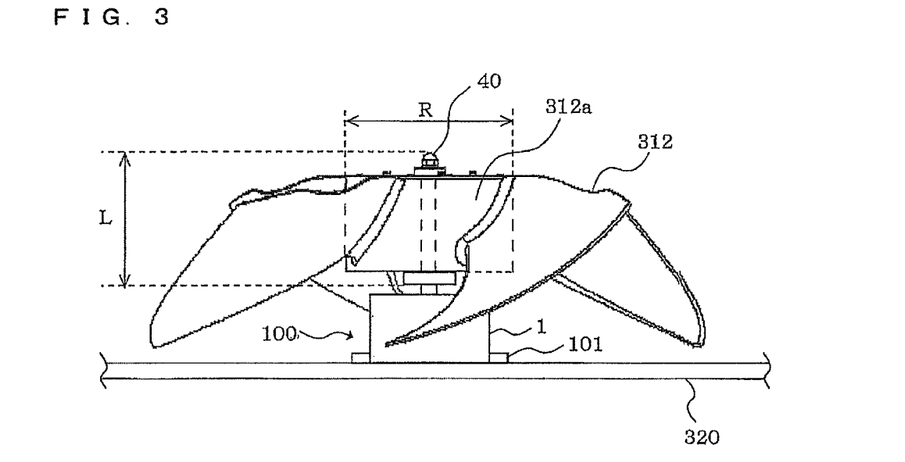
FIG. 3 is a side view of the outdoor fan motor and a fan according to Embodiment of the present invention.

FIG. 3 is a side view of the motor 100 and the fan 312. Referring to FIG. 3, a state of installation of the motor 100 will now be described. As illustrated in FIG. 3, the motor 100 is installed on a supporting member 320 with the aid of the leg portions 101. The fan 312 is attached to the shaft 40 of the motor 100.

In FIG. 3, the supporting member 320 includes, for example, two rails. A bottom side of the motor 100 (the side having the bottom portion 2) is in contact with the supporting member 320 while the shaft 40 extends upward. The fan 312 is attached to the shaft 40 of the motor 100. When the rotor 30 of the motor 100 rotates, the fan 312 is driven.

The length of the shaft 40 is set such that a predetermined gap is provided between the lower end of each of blades of the fan 312 and the supporting member 320. In Embodiment 1, the motor 100 is secured on the supporting member 320. Therefore, a length L of the shaft 40 can be made shorter than in a case where a central portion of the motor 100 is supported. By reducing the length of the shaft 40, the occurrence of axial shift of the fan 312 is suppressed. In the motor 100 according to Embodiment 1, the diameter in plan view (the diameter of the body outer shell 1) is smaller than a diameter R of a boss 312*a* of the fan 312. With such a configuration, the resistance of the wind blowing from the lower side toward the upper side of the motor is reduced.

Figure 4:
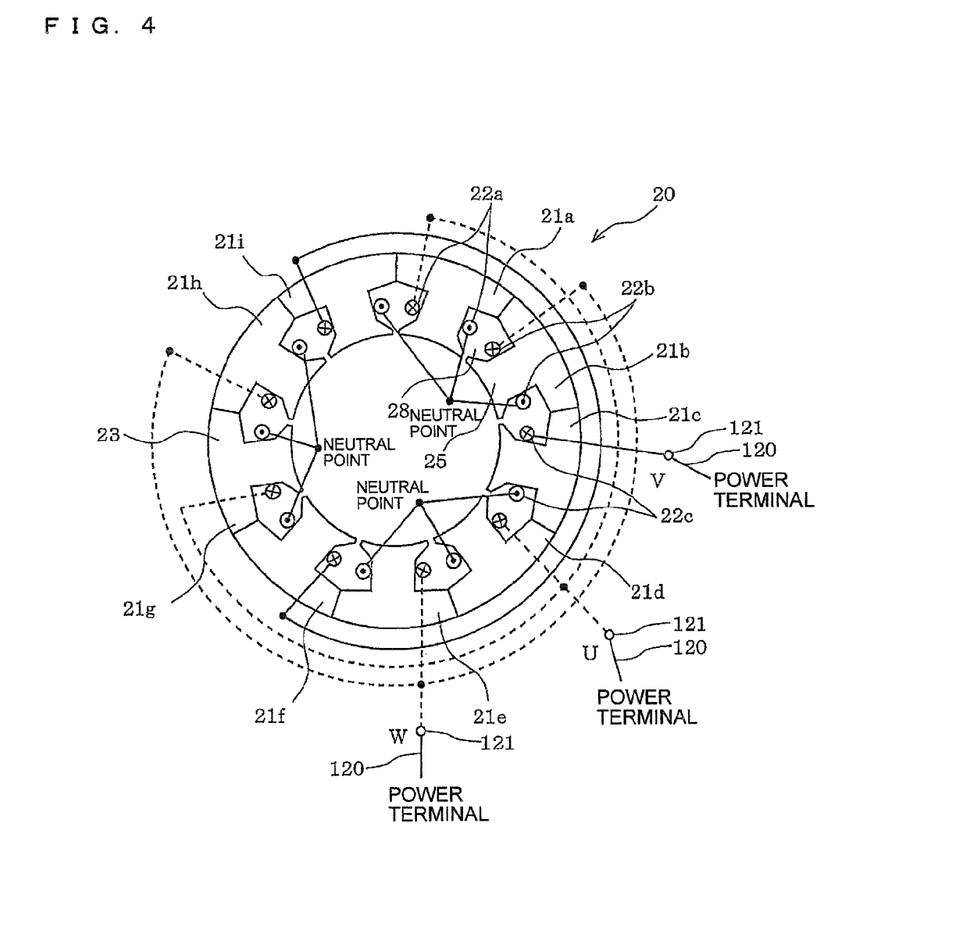
FIG. 4 is a schematic diagram illustrating a state of electrical connection of the outdoor fan motor according to Embodiment of the present invention.

FIG. 4 is a schematic diagram illustrating a state of electrical connection of the motor 100. Referring to FIG. 4, the state of electrical connection of the stator 20 that employs a concentrated winding method in which wires are concentratedly wound around split cores will now be described. FIG. 4 illustrates an exemplary nine-slot stator 20 including nine split cores. In FIG. 4, the terminal block 50 is not illustrated. While the following description concerns an exemplary case of three-phase Y-connection, three-phase delta (Δ)-connection may alternatively be employed.

The stator 20 basically includes a plurality of split cores 21 (split cores 21*a* to 21*i*) and windings 22 (windings 22*a* to 22*c*) that are concentratedly wound around the split cores 21. The split cores 21 each include a core back 23 having a substantially annular shape forming an outer circumferential portion thereof, and a tooth portion 25 provided in a plural numbers and projecting in the radial direction from the inner circumferential side of the core back 23. A slot 28 is provided between adjacent ones of the tooth portions 25.

The split cores 21 each have a substantially T shape. Portions of the respective split cores 21 that are connected annularly correspond to the core backs 23. The split cores 21 include the respective tooth portions 25 on inner circumferential portions thereof. The slot 28 is provided between adjacent ones of the tooth portions 25. The tooth portions 25 are provided with the windings 22 that are concentratedly wound therearound with non-illustrated insulators (also called spools) interposed therebetween. The stator 20 is connected to a three-phase (including U. V, and W phases) alternating-current power source (including an inverter) with the wires having been connected in, for example, the Y manner in advance. In the following description, the U phase corresponds to the winding 22*a*, the W phase corresponds to the winding 22*b*, and the V phase corresponds to the winding 22*c*.

The winding 22*a* for the U phase is wound around each of the split core 21*a*, the split core 21*d*, and the split core 21*g*. The windings 22*a* wound around the split core 21*a*, the split core 21*d*, and the split core 21*g*, respectively, are connected in series. A corresponding one of the lead wires 120 is connected to a leading end of the series of the windings 22*a*, whereby the series of the windings 22*a* is connected to the U phase via the lead wire 120. The lead wire 120 and the series of the windings 22*a* are connected to each other via a connection portion 121.

The winding 22*b* for the V phase is wound around each of the split core 21*b*, the split core 21*e*, and the split core 21*h*. The windings 22*b* wound around the split core 21*b*, the split core 21*e*, and the split core 21*h*, respectively, are connected in series. A corresponding one of the lead wires 120 is connected to a leading end of the series of the windings 22*b*, whereby the series of the windings 22*b* is connected to the W phase via the lead wire 120. The lead wire 120 and the series of the windings 22*b* are connected to each other via a connection portion 121.

The winding 22*c* for the W phase is wound around each of the split core 21*c*, the split core 21*f*, and the split core 21*i*. The windings 22*c* wound around the split core 21*c*, the split core 21*f*, and the split core 21*i*, respectively, are connected in series. A corresponding one of the lead wires 120 is connected to a leading end of the series of the windings 22*c*, whereby the series of the windings 22*c* is connected to the V phase via the lead wire 120. The lead wire 120 and the series of the windings 22*c* are connected to each other via a connection portion 121.

The ends of the lead wires 120 that are opposite the ends connected to the series of the windings 22*a*, the series of the windings 22*b*, and the series of the windings 22*c* are connected together and form respective neutral points. The lead wires 120, which are aluminum wires or copper wires, are laid along grooves provided in the outer circumferences of the non-illustrated insulators and are connected to the respective phases.

The motor 100 according to Embodiment 1 employs aluminum wires as the windings 22 and copper wires as the lead wires 120 that connect the windings 22 for the different phases to the terminal block 50. Since aluminum is of lower cost than copper, employing aluminum wires as the windings 22 leads to a cost reduction. However, aluminum wires have the following problem.

In the motor 100 in which the terminal block 50 is provided in the bottom portion 2 of the body outer shell 1, water that has been swirled up with the airflow that is produced by the fan 312 may adhere to the bottom portion 2. As described above, although the base portion of the terminal block 50 is embedded in the bottom portion 2, there is a gap between the embedded portion and the resin. Accordingly, water may enter the gap.

Copper is highly resistant to corrosion and does not corrode even if a small amount of water adheres thereto. However, since the motor 100 employs aluminum wires, such aluminum wires may corrode even with a small amount of water. If the corrosion of the aluminum wires progresses, wire connection failure may occur eventually. In addition, it should be noted that, although aluminum wires are each coated with enamel and portions of the respective aluminum wires from which the enamel coatings are mechanically stripped are twisted and dipped into solder, it is unclear whether or not the stripped portions are assuredly coated with the solder, depending on the control accuracy.

If the lead wires 120 are also made of aluminum wires that are each coated with enamel, the following problem may also occur. As described above, the lead wires 120 are laid along the grooves provided in the outer circumferences of the insulators. Hence, to prevent the occurrence of damage to the enamel coatings, a varnished tube or the like is provided over each of the lead wires 120, whereby the enamel coating is protected. However, there is also a gap between the varnished tube and the lead wire 120, and water may enter the gap. Note that at least three grooves are provided in the outer circumference of each insulator so that the lead wires 120 connected to the respective phases can be laid therealong.

[Countermeasure 1 to Water Entry]

Figure 5:
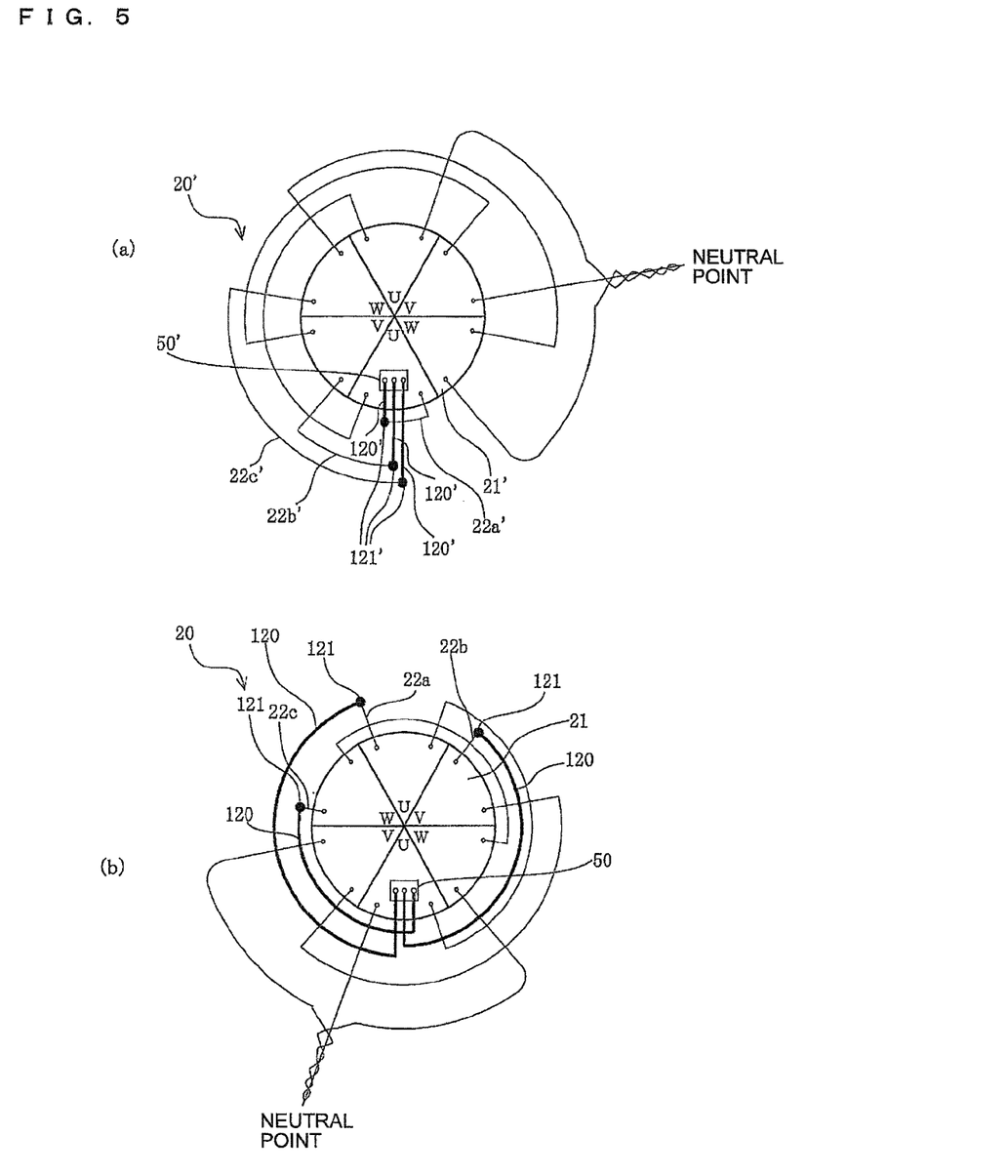
FIG. 5 is a diagram illustrating a state of wire connection of the outdoor fan motor according to Embodiment of the present invention.

FIG. 5 is a diagram illustrating a state of wire connection of the motor 100. Referring to FIG. 5, the state of wire connection of a six-slot stator 20 and a countermeasure to water entry will now be described. FIG. 5 includes part (a) illustrating a state of wire connection of another six-slot stator for comparison. Reference numerals that denote elements included in the known stator are each suffixed with a prime (') so that they are easily distinguished from those of the motor 100. The terminal block 50 illustrated in FIG. 5 corresponds to a portion thereof that is on one of the split cores 21, not a portion that is on the exposed surface of the bottom portion 2.

As can be seen from the state of wire connection of the known stator 20' illustrated in FIG. 5(*a*), when lead wires 120' are connected to a terminal block 50', it is common that each of the lead wires 120' and the terminal block 50' are connected to each other with the shortest possible distance so that the lengths of the lead wires 120' are reduced. If the lead wires 120' are also made of aluminum wires, the probability that the above problems may occur increases. Therefore, in the stator 20', copper wires are employed as the lead wires 120' so as to counteract the water problems. In addition, a joining portion (twisted portion) between windings 22' for each of the phases resides on the radially outer side with respect to the stator 20' so that the joining portion can be dipped into solder. This also applies to the stator 20.

However, with the stator 20', the probability that water having entered from the terminal block 50' may reach the aluminum wires forming the windings 22' is not completely eliminated. That is, since there is only a short distance between the terminal block 50' and a connection portion 121' that is formed between each of the aluminum wires forming the windings 22' and a corresponding one of the lead wires 120', water that has entered from the terminal block 50' may run along the lead wires 120' and reach the aluminum wires forming the windings 22' via the connection portions 121'.

Typically, the position where the terminal block 50' is to be provided is predetermined. This also applies to the terminal block 50 of the stator 20. In general, the connection portions 121' are each obtained by winding the aluminum wire around the lead wire 120'. This also applies to the connection portions 121 of the stator 20, because aluminum wires are easier to process than copper wires.

Hence, in the motor 100, as illustrated in FIG. 5(*b*), the connection portions 121 between the respective aluminum wires forming the windings 22 and the respective lead wires 120 are provided as distant as possible from the terminal block 50. To provide the connection portions 121 far from the terminal block 50, the leading end of the winding 22 for each of the phases is desired to be set at a position opposite the terminal block 50, that is, a position offset by 180 degrees or more about the center of rotation. However, the leading end of the winding 22 for each of the phases only needs to reside on any of the split cores 21 that is not adjacent to the split core 21 on which the terminal block 50 is provided. Thus, in the motor 100, the lead wires 120 made of copper wires can each have a large length, and water that has entered from the terminal block 50 is prevented from reaching the aluminum wires forming the windings 22.

Hence, in the motor 100, a cost reduction is realized with the aluminum wires employed as the windings 22. Furthermore, since the lead wires 120 made of copper wires and the windings 22 made of aluminum wires are connected to each other at positions far from the terminal block 50, the probability that water having entered from the terminal block 50 may reach the aluminum wires is minimized. Therefore, the life of the motor 100 is extended. While the above description concerns a countermeasure to water entry in the case of Y-connection, the above countermeasure to water entry is also applicable to a case of delta (Δ)-connection.

Figure 6:
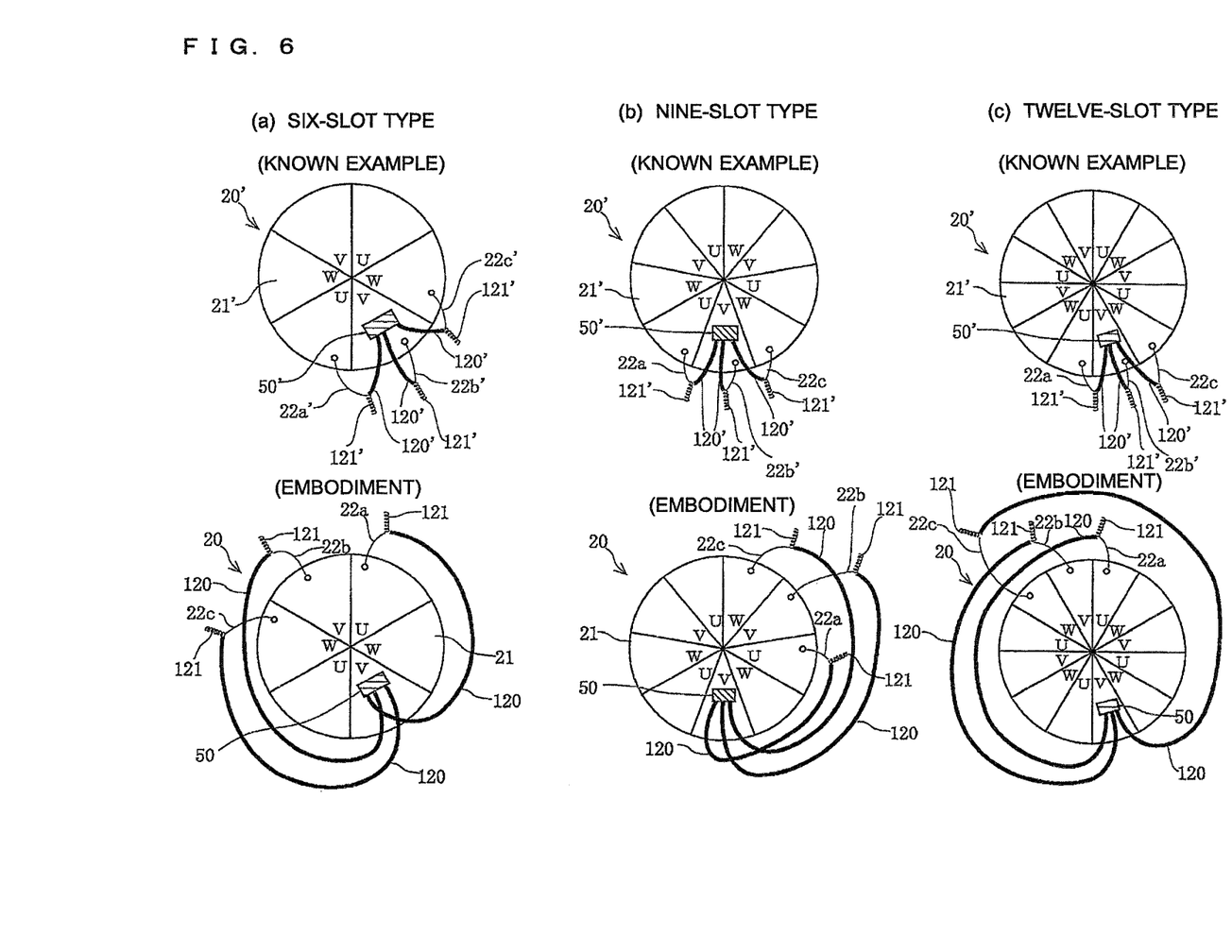
FIG. 6 is a diagram schematically illustrating states of wire connection of stators that are of three different slot types applicable to the outdoor fan motor according to Embodiment of the present invention.

FIG. 6 is a diagram schematically illustrating states of wire connection of stators 20 that are of three different slot types. Referring to FIG. 6, the states of wire connection of the stators 20 will now be described. FIG. 6 includes part (a) illustrating a six-slot stator 20, part (b) illustrating a nine-slot stator 20, and part (c) illustrating a twelve-slot stator 20. FIG. 6 also illustrates states of wire connection of known stators that are of the respective types for comparison. Reference numerals that denote elements included in the known stators are each suffixed with a prime (') so that they are easily distinguished from those of the motor 100. The terminal blocks 50 illustrated in FIG. 6 each correspond to a portion thereof that is on one of the split cores 21, not a portion that is on the exposed surface of the bottom portion 2.

In each of the stators 20' of the respective types illustrated in FIG. 6, each of the lead wires 120' and the terminal block 50' are connected to each other with the shortest possible distance. Therefore, as described above, water that has entered from the terminal block 50 may run along the lead wires 120' and reach the aluminum wires forming the windings 22' via the connection portions 121.

Hence, in each of the motors 100 that are of the respective slot types, the connection portions 121 between the aluminum wires forming the windings 22 and the lead wires 120 are provided as distant as possible from the terminal block 50 as described above. Furthermore, in the motor 100, the lead wires 120 that are made of copper wires have large lengths, whereby water that has entered from the terminal block 50 is prevented from reaching the aluminum wires forming the windings 22.

In the six-slot type illustrated in FIG. 6(a), the terminal block 50 is provided on one of the split cores 21 for the V phase that is on the lower side of the page. The leading end of the aluminum wire forming the winding 22a for the U phase resides on one of the split cores 21 for the U phase that is not adjacent to the split core 21 on which the terminal block 50 is provided. Furthermore, the leading end of the aluminum wire forming the winding 22b for the V phase resides on one of the split cores 21 for the V phase that is opposite the split core 21 on which the terminal block 50 is provided. Furthermore, the leading end of the aluminum wire forming the winding 22c for the W phase resides on one of the split cores 21 for the W phase that is not adjacent to the split core 21 on which the terminal block 50 is provided.

In the nine-slot type illustrated in FIG. 6(b), the terminal block 50 is provided on one of the split cores 21 for the V phase that is on the lower side of the page. The leading end of the aluminum wire forming the winding 22a for the U phase resides on any (the one on the right side of the page in this case) of the split cores 21 for the U phase that is not adjacent to the split core 21 on which the terminal block 50 is provided. Furthermore, the leading end of the aluminum wire forming the winding 22b for the V phase resides on any (the one on the right side of the page in this case) of the split cores 21 for the V phase that is not adjacent to the split core 21 on which the terminal block 50 is provided. Furthermore, the leading end of the aluminum wire forming the winding 22c for the W phase resides on any (the one on the right side of the page in this case) of the split cores 21 for the W phase that is not adjacent to the split core 21 on which the terminal block 50 is provided.

In the twelve-slot type illustrated in FIG. 6(c), the terminal block 50 is provided on one of the split cores 21 for the V phase that is on the lower side of the page. The leading end of the aluminum wire forming the winding 22a for the U phase resides on any (the one on the upper side of the page in this case) of the split cores 21 for the U phase that is not adjacent to the split core 21 on which the terminal block 50 is provided. Furthermore, the leading end of the aluminum wire forming the winding 22b for the V phase resides on one of the split cores 21 for the V phase that is opposite the split core 21 on which the terminal block 50 is provided. Furthermore, the leading end of the aluminum wire forming the winding 22c for the W phase resides on any (the one on the upper left side of the page in this case) of the split cores 21 for the W phase that is not adjacent to the split core 21 on which the terminal block 50 is provided.

As described above, regardless of the slot type of the motor 100, the leading end of the aluminum wire forming the winding 22 for each of the phases resides on one of the split cores 21 that is not adjacent to the split core 21 on which the terminal block 50 is provided. Therefore, in the motor 100, the lead wires 120 that are made of copper wires have large lengths, whereby water that has entered from the terminal block 50 is prevented from reaching the aluminum wires forming the windings 22. Hence, in the motor 100, a cost reduction is realized with the aluminum wires employed as the windings 22. In addition, since each of the lead wires 120 made of copper wires and a corresponding one of the aluminum wires are connected to each other at a position far from the terminal block 50, the probability that water having entered from the terminal block 50 may reach the aluminum wires is minimized. Consequently, the life of the motor 100 is extended.

As described above, to provide the connection portions 121 at positions far from the terminal block 50, the leading end of the winding 22 for each of the phases is desired to be at a position opposite the terminal block 50, that is, a position offset by 180 degrees or more about the center of rotation. However, the leading end of the winding 22 for each of the phases only needs to reside on one of the split cores 21 that is not adjacent to the split core 21 on which the terminal block 50 is provided.

[Countermeasure 2 to Water Entry]

Figure 7:
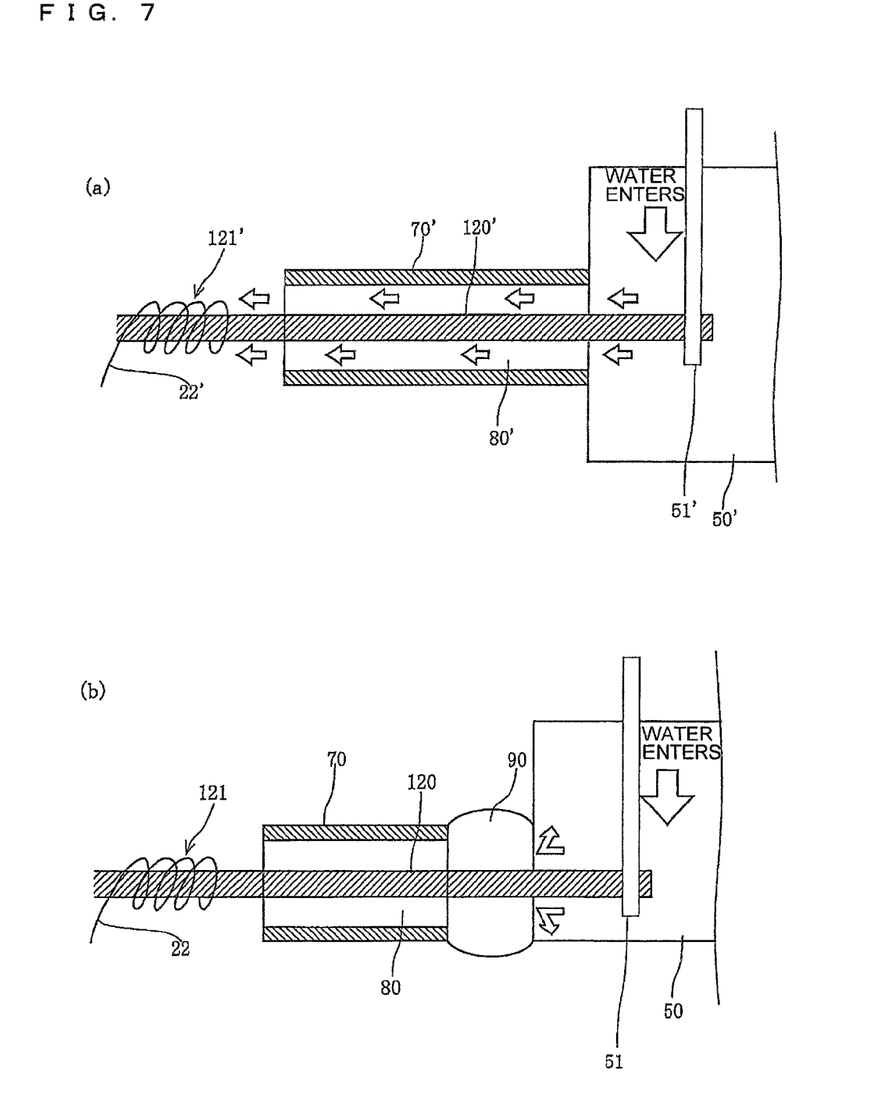
FIG. 7 is a diagram illustrating a portion where a terminal block and one of lead wires included in the outdoor fan motor according to Embodiment of the present invention are connected to each other.
Figure 8:
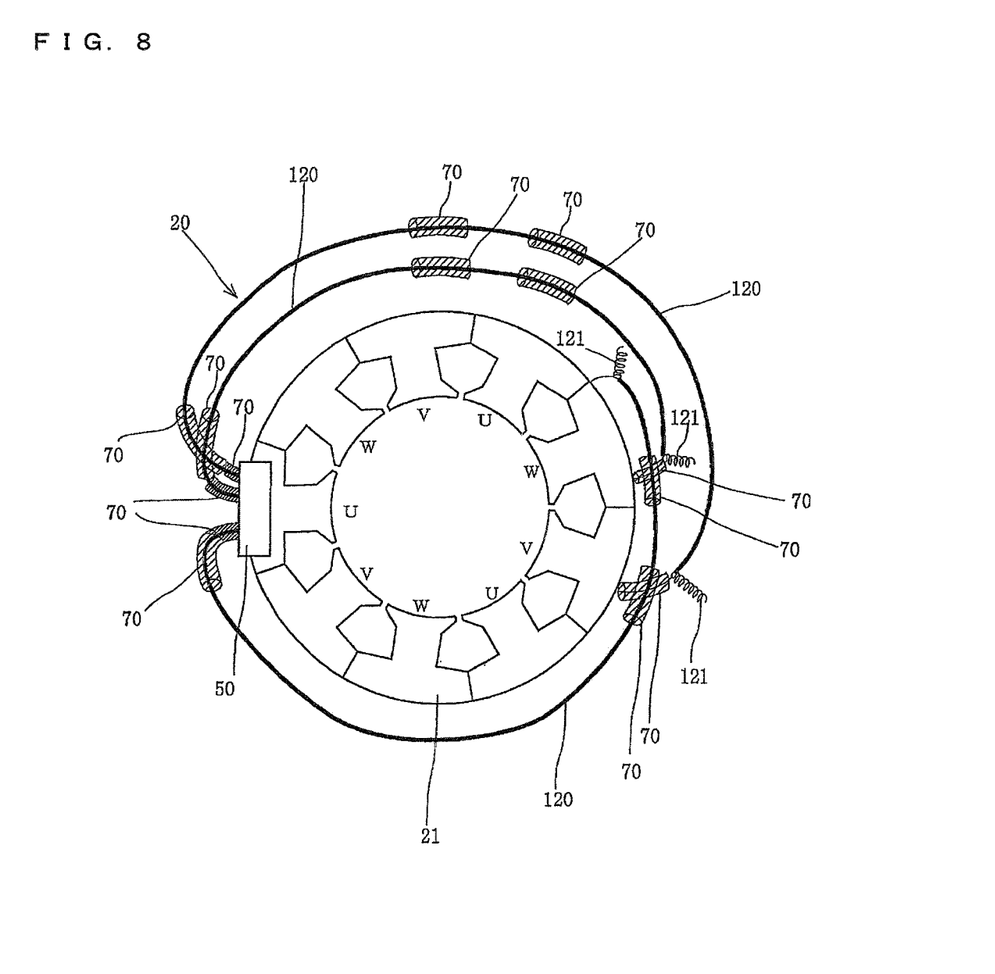
FIG. 8 is a schematic plan view illustrating portions where the terminal block and the lead wires included in the outdoor fan motor according to Embodiment of the present invention are connected to each other.

FIG. 7 is a diagram illustrating a portion where the terminal block 50 and one of the lead wires 120 are connected to each other. FIG. 8 is a schematic plan view illustrating portions where the terminal block 50 and the lead wires 120 are connected to each other. Referring to FIGS. 7 and 8, the connection between the terminal block 50 and the lead wires 120 and another countermeasure to water entry will now be described. FIG. 7(a) illustrates a portion where a terminal block and a lead wire included in a known stator as a comparative example are connected to each other. FIG. 7(b) illustrates a portion where the terminal block 50 and the lead wire 120 are connected to each other. Reference numerals that denote elements included in the known stators are each suffixed with a prime (') so that they are easily distinguished from those of the motor 100. In FIG. 7, the flow of water is illustrated by arrows.

The description in [Countermeasure 1 to Water Entry] concerns an exemplary case where the connection portions 121 are provided distant from the terminal block 50, whereby water that has entered from the terminal block 50 is prevented from reaching the aluminum wires forming the windings 22. In [Countermeasure 2 to Water Entry], the gap between the varnished tube and each of the lead wires 120 is closed, whereby water that has entered from the terminal block 50 is prevented from reaching the aluminum wires forming the windings 22.

As described above, to prevent the occurrence of damage to the enamel coating, a varnished tube or the like is provided over each of the lead wires, whereby the enamel coating is protected. However, there is also a gap between the varnished tube and the lead wire, and water may enter the gap. That is, in the known example illustrated in FIG. 7(a), although the lead wire 120' provided with a varnished tube 70' is connected to a terminal 51' of the terminal block 50', water that has entered the terminal block 50' from the outside may flow through a gap 80' between the varnished tube 70' and the lead wire 120' and reach the aluminum wire.

Accordingly, in the motor 100 illustrated in FIG. 7(b), a portion of a varnished tube 70 that is near the terminal block 50 is stripped, whereby a portion of the lead wire 120 is exposed. Then, a water entry preventing member 90 is provided over the portion of the lead wire 120. Thus, water that has entered from the terminal block 50 is prevented from reaching a gap 80 between the varnished tube 70 and the lead wire 120. It is desirable that the water entry preventing member 90 be in contact with the terminal block 50. However, the water entry preventing member 90 is not necessarily in contact with the terminal block 50 as long as the water entry preventing member 90 is provided at a position where the water entry preventing member 90 can close the gap 80 between the varnished tube 70 provided near the terminal block 50 and the lead wire 120. The lead wire 120 is connected to a terminal 51 provided in the terminal block 50.

Typically, as illustrated in FIG. 8, the varnished tube 70 is provided over at least each of portions where the lead wire 120 or the winding 22 and any other member (for example, the terminal block 50, the insulator, the lead wire 120 or the winding 22 that is connected to another phase, or the like) are connected to each other. The varnished tube 70 is positioned by using adhesive, resin, or the like and is fixed by a resin mold that is formed as the body outer shell 1. As illustrated in FIG. 7, since the motor 100 includes the water entry preventing members 90, the probability that water having entered from the terminal block 50 may reach the aluminum wires is minimized. Furthermore, water entry is also prevented at the portions where the varnished tubes 70 are provided. Therefore, water is more difficult to reach the aluminum wires.

The water entry preventing members 90 may each be molded from resin such as unsaturated polyester, saturated polyester, foaming resin, or the like. The water entry preventing member 90 may also serve as, for example, the adhesive or the like that is used to fix the varnished tube 70. That is, the water entry preventing member 90 may be made of a material that can close the gap 80.

Hence, in the motor 100, a cost reduction is realized with the aluminum wires employed as the windings 22. Moreover, since the water entry preventing member 90 is provided over each of the lead wires 120 that are connected to the terminal block 50, the probability that water having entered from the terminal block 50 may reach the aluminum wires is minimized. Therefore, the life of the motor 100 is extended.

The water entry preventing member 90 only needs to close the gap 80, and the size, shape, material, and other factors thereof are not specifically limited. The varnished tube 70 may be of a generally available type. Alternatively, a sheet of varnish may be rolled into a cylinder, which may be employed as the varnished tube 70. Furthermore, the varnished tube 70 may contain a heat-shrinkable material.

FIG. 8 illustrates an exemplary case where [Countermeasure 1 to Water Entry] and [Countermeasure 2 to Water Entry] are combined. Therefore, water is more difficult to reach the aluminum wires than in the case where only one of the countermeasures is taken. Furthermore, while FIG. 8 illustrates an exemplary case where a plurality of separate varnished tubes 70 are provided, a varnished tube 70 in the form of an integral body may be provided over the entirety of each of the windings 22 and the lead wires 120 that are exposed on the outside of the split cores 21.

[Countermeasure 3 to Water Entry]

Figure 9:
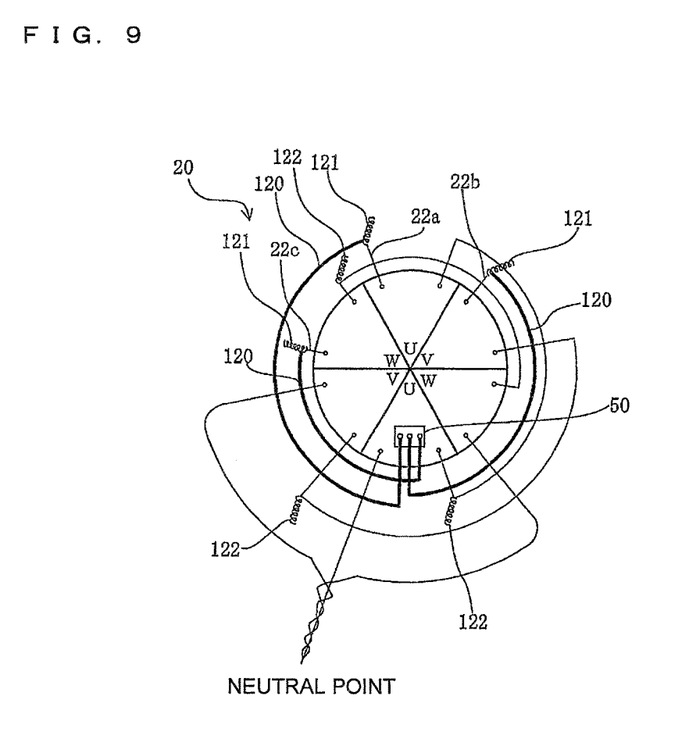
FIG. 9 is a plan view schematically illustrating a state of connection of split cores included in the outdoor fan motor according to Embodiment of the present invention.

FIG. 9 is a plan view schematically illustrating a state of connection of the split cores 21. Referring to FIG. 9, yet another countermeasure to water entry will now be described. FIG. 9 illustrates an exemplary six-slot stator 20.

In [Countermeasure 3 to Water Entry], a dehumidifying agent or varnish is applied to the connection portions 121 and joining portions 122, whereby water having entered from the terminal block 50 is prevented from reaching the aluminum wires forming the windings 22.

The connection portions 121 are each formed by connecting the aluminum wire and the copper wire to each other by twisting the two together. To allow the aluminum wire and the copper wire to be electrically continuous with each other, enamel coatings provided over a portion of the aluminum wire and a portion of the copper wire that are to form the connection portion 121 are mechanically stripped. Subsequently, the aluminum wire and the copper wire are twisted together, whereby the connection portion 121 is formed. Then, the connection portion 121 is dipped into solder. If the connection portion 121 is assuredly coated with solder, since the solder corrodes earlier than the aluminum wire in the event of water reaching the connection portion 121, the aluminum wire does not corrode as long as the solder is present. Instead of mechanically stripping the enamel coating of the copper wire, the enamel coating of the copper wire may be thermally stripped simultaneously with the solder dipping.

The joining portions 122 are each formed by connecting the aluminum wires forming the windings 22 for the same phase to each other by twisting the two together. To allow the aluminum wires to be electrically continuous with each other, enamel coatings provided over portions of the respective aluminum wires that are to form the joining portion 122 are mechanically stripped. Subsequently, the aluminum wires are twisted together, whereby the joining portion 122 is formed. Then, the joining portion 122 is dipped into solder. If the joining portion 122 is assuredly coated with solder, since the solder corrodes earlier than the aluminum wires in the event of water reaching the joining portion 122, the aluminum wires do not corrode as long as the solder is present.

Depending on the control accuracy in solder dipping, however, it is unclear whether or not the connection portion 121 and the joining portion 122 are assuredly coated with the solder. For example, if any of the aluminum wires includes a portion of even 1 mm in length that is not coated with the solder and if water adheres to that portion, the corrosion of the aluminum wires forming the connection portion 121 and the joining portion 122 will progress.

Hence, in the motor 100, at least one of a dehumidifying agent and varnish is applied to the connection portion 121 and the joining portion 122 so that no portions of the aluminum wires are exposed. Thus, in the motor 100, portions of the aluminum wires that are to form the connection portion 121 and the joining portion 122 with their enamel coatings stripped are prevented from being exposed. Consequently, water having entered from the terminal block 50 is prevented from reaching the aluminum wires forming the windings 22.

Hence, in the motor 100, a cost reduction is realized with the aluminum wires employed as the windings 22. In addition, since the exposure of the aluminum wires in portions that are to form the connection portion 121 and the joining portion 122 is avoided, the probability that water having entered from the terminal block 50 may reach the aluminum wires is minimized. Consequently, the life of the motor 100 is extended.

While the dehumidifying agent may be a generally available, highly moisture-resistant, insulating coating whose chief component is acryl, polyurethane, or the like, it is preferred that the dehumidifying agent have an excellent quick-drying characteristic. While the varnish may be a generally available varnish, it is preferred that the varnish have an excellent quick-drying characteristic. Furthermore, at least one of the dehumidifying agent and the varnish only needs be applied. Alternatively, both of the two may be applied.

In Embodiment 1, the individual countermeasures to water entry from the terminal block 50, specifically, [Countermeasure 1 to Water Entry] to [Countermeasure 3 to Water Entry], have been described separately. The motor 100 may include any one of or any combination of those countermeasures.

REFERENCE SIGNS LIST 1 body outer shell 2 bottom portion 20 stator 21 split core 21a split core 21b split core 21c split core 21d split core 21e split core 21f split core 21g split core 21h split core 21i split core 22 winding 22a winding 22b winding 22c winding 23 core back 25 tooth portion 28 slot 30 rotor 40 shaft 50 terminal block 51 terminal 70 varnished tube 80 gap 90 water entry preventing member 100 motor 101 leg portion 120 lead wire 121 connection portion 122 joining portion 300 outdoor unit 308 air inlet 309 air outlet 310 casing 311 fan guard 312 fan 312a boss 320 supporting member

The invention claimed is:

1. An outdoor fan motor comprising:
   a stator including a plurality of cores and in which aluminum wires are used as windings;
   a rotor rotatably provided on an inner circumferential side of the stator;
   a body outer shell provided as a resin mold that secures the stator;
   a terminal block embedded in a bottom portion of the body outer shell and including terminals with which the stator and an external power source are connected to each other, the terminal block being provided on one of the plurality of cores; and
   lead wires made of copper wires and connecting the terminals of the terminal block to the aluminum wires forming the windings,
   wherein a connection portion between each of the lead wires and a corresponding one of the aluminum wires of the windings is provided distant from the terminal block, and a leading end of each of the aluminum wires of the windings residing on another of the plurality of cores that is nonadjacent the one of the plurality of cores on which the terminal block is provided.

2. The outdoor fan motor of claim 1,
   wherein a position of the leading end of each of the windings is offset by 180 degrees or more about a center of rotation with respect to the core of the cores that is at the position where the terminal block is provided.

3. The outdoor fan motor of claim 1,
   wherein a portion of the terminal block is embedded in the bottom portion, and the embedded portion is on any of the cores.

4. The outdoor fan motor of any one of claim 1,
   wherein at least either of a dehumidifying agent and varnish is applied to the connection portion and a joining portion between the aluminum wires.

5. An air-conditioning apparatus comprising:
   a fan provided in a casing and configured to take in air from an air inlet and to blow the air that has passed through a heat exchanger from an air outlet;
   the outdoor fan motor of claim 1 that drives the fan; and
   a supporting member to which the outdoor fan motor is secured with a securing member.

6. The outdoor fan motor of claim 1, wherein
   the plurality of cores includes first, second and third cores sequentially connected into an annular shape forming the stator,
   the aluminum wires include three windings including a first-phase windings wound around the first cores and wired in series, a second-phase windings wound around the second cores and wired in series, and a third-phase windings wound around the third cores and wired in series,
   three lead wires respectively connect a three-phase power source to a terminal end of each of the first-phase windings, the second-phase windings and the third-phase windings, and
   a leading end of each of the first-phase, second-phase and the third-phase windings other than the terminal end is respectively connected and configured to complete a circuit to the three-phase power source.

* * * * *